Jan. 26, 1965    J. PICKLES    3,167,296
SEAT ADJUSTING MECHANISM
Filed May 28, 1962    2 Sheets-Sheet 1

INVENTOR.
JOSEPH PICKLES
BY
Whittemore
Hulbert & Belknap
ATTORNEYS

Jan. 26, 1965   J. PICKLES   3,167,296
SEAT ADJUSTING MECHANISM
Filed May 28, 1962   2 Sheets-Sheet 2
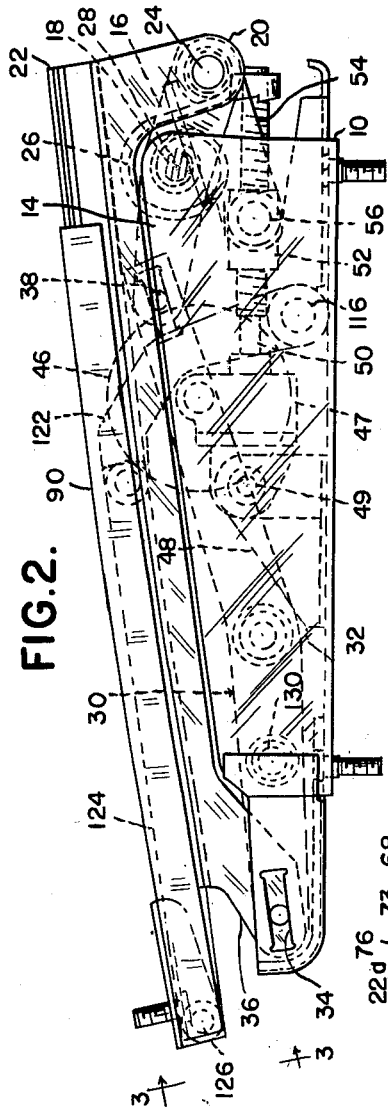
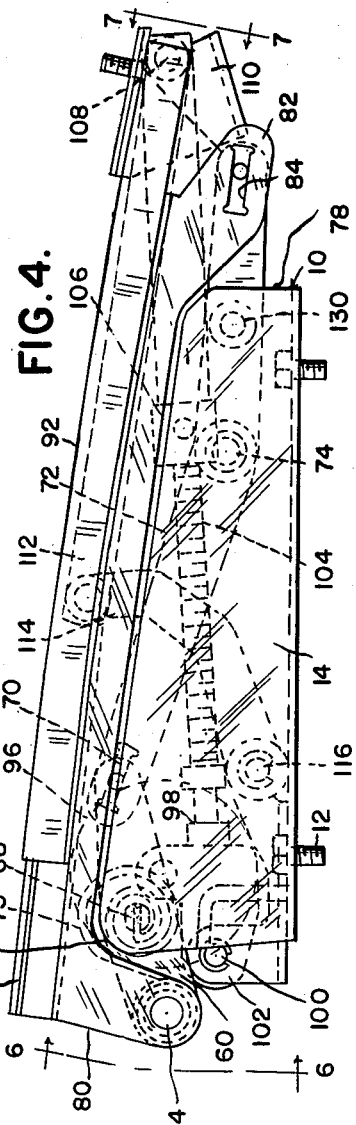
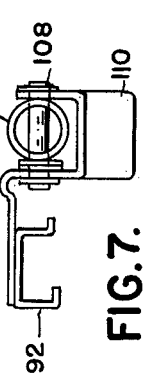
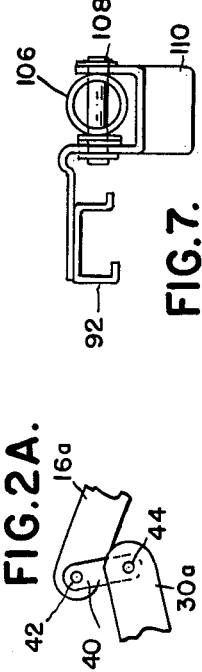
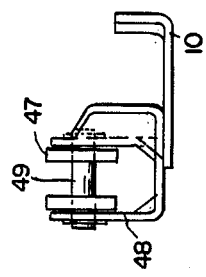
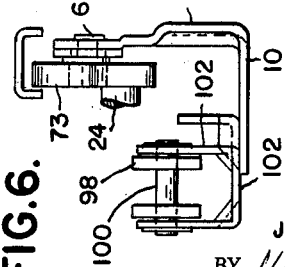
INVENTOR.
JOSEPH PICKLES
BY Whittemore,
Hulbert & Belknap
ATTORNEYS

United States Patent Office 3,167,296
Patented Jan. 26, 1965

3,167,296
SEAT ADJUSTING MECHANISM
Joseph Pickles, Dearborn, Mich., assignor to Ferro Stamping Company, Detroit, Mich., a corporation of Michigan
Filed May 28, 1962, Ser. No. 198,167
11 Claims. (Cl. 248—419)

The present invention relates to seat adjusting mechanism, and more particularly, to seat supporting and adjusting mechanism for an automotive vehicle adapted to provide four-way adjustment.

It is an object of the present invention to provide a simplified construction effective to adjust the seat vertically and in a fore and aft direction.

It is a feature of the present invention to provide seat adjusting mechanism comprising front and rear height adjusting levers mounted for rocking movement intermediate their ends, the front end of the front lever and the rear end of the rear lever being pivotally connected to a seat supporting frame, and means interconnecting the rearwardly extending portion of the front lever and the forwardly extending portion of the rear lever.

It is a further feature of the present invention to provide in a seat adjusting mechanism a pair of height adjusting levers mounted for rocking movement intermediate their ends and extending in a fore and aft direction, the opposite end portions of said levers being pivotally connected to a seat supporting frame, the adjacent ends of said levers overlapping each other, and means interconnecting the overlapping ends of said levers.

It is a further feature of the present invention to provide mechanism as described in the preceding paragraph in which the vehicle seat is mounted for fore and aft sliding movement on said seat support frame.

Other objects and features of the invention will become apparent as the description proceeds, especially when taken in conjunction with the accompanying drawings, illustrating a preferred embodiment of the invention, wherein:

FIGURE 2 is a side elevation of the mechanism as seen from the left in FIGURE 1.

FIGURE 2A is a fragmentary view illustrating a modified connection between lift levers.

FIGURE 3 is a fragmentary rear elevational view looking in the direction of the arrows 3—3, FIGURE 2.

FIGURE 4 is a side elevational view of the mechanism as seen from the right in FIGURE 3.

FIGURE 6 is a fragmentary front elevational view looking in the direction of the arrows 6—6, FIGURE 4.

FIGURE 7 is a fragmentary end view looking in the direction of the arrows 7—7, FIGURE 4.

The seat supporting and adjusting mechanism comprises generally similar assemblies adapted to be positioned adjacent opposite ends of the front seat of a motor vehicle and the mechanisms are interconnected by torsion bars extending transversely of the vehicle to insure simultaneously identical operation of the mechanisms at opposite ends of the seat.

Figure 1:
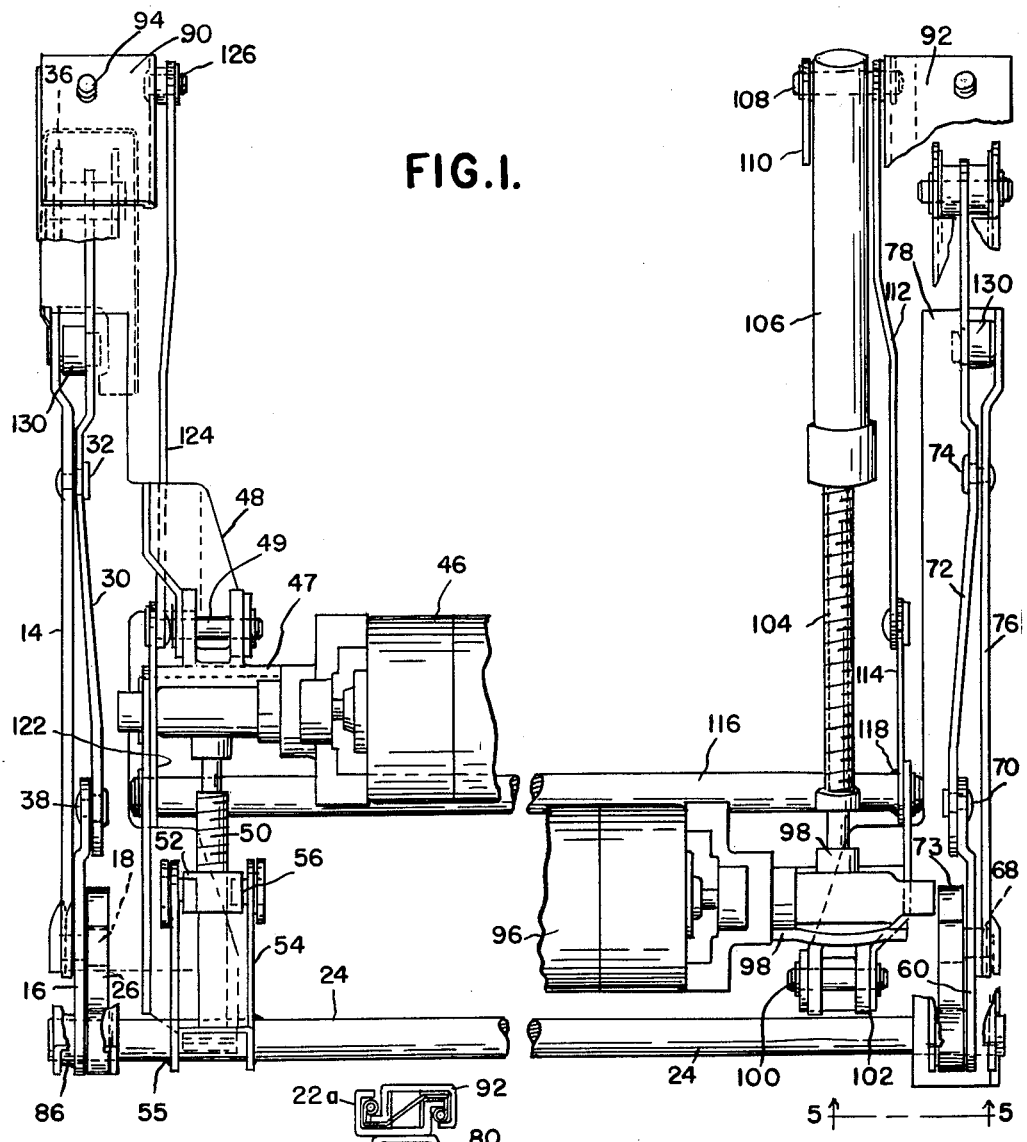
FIGURE 1 is a plan view of the seat adjusting mechanism.

Referring first to FIGURES 1–3 the seat adjusting mechanism at the right hand side of the vehicle is illustrated. This mechanism comprises a base 10 adapted to be fastened to the floor of the vehicle by suitable assembly screws 12. The base 10 at the front end thereof includes an upstanding flange portion 14 to which a front height adjusting lever 16 is pivoted by means including a pivot stud 18. The lever 16 extends in a fore and aft direction and its front end is pivotally connected to a depending front leg 20 on a seat supporting frame 22 by pivot means including the torsion bar 24 to which the lever 16 is fixed and which extends transversely across the front of the seat adjusting mechanism. Interconnecting the pivot stud 18 and the torsion bar 24 is a spring 26 one end of which as indicated at 28, is received in a slot in the pivot stud 18. The spring is arranged to provide an upward force acting on the leg 20 so as to counterbalance in part the weight of the seat and supported structure.

Adjacent the rear of the base 10 there is pivoted the rear height adjusting lever 30, the pivot connection comprising a rivet 32. The lever 30 extends in a fore and aft direction and its rear end is connected by a pin and slot connection indicated at 34 to the rear downwardly depending legs 36 of the seat supporting frame 22.

It will be observed that the forward end of the rear height adjusting lever overlaps the rear end of the front height adjusting lever and these overlapped end portions of levers 16 and 30 are interconnected as by a pin and slot connection illustrated at 38.

With the foregoing arrangement it will be observed that counterclockwise rocking movement of the front height adjusting lever 16, which raises the front end of the seat supporting frame 22, results in clockwise rotation of the rear height adjusting lever 30 which simultaneously raises the rear edge of the seat supporting frame 22.

Instead of providing the pin and slot connection between the levers 16 and 30 these may be connected as indicated in FIGURE 2A where the front end of a rear height adjusting lever 30a is shown as connected to the rear end of the front height adjusting lever 16a by means of a rigid link 40 which is pivoted to lever 16a as indicated at 42, and pivoted as indicated at 44 to the lever 30a.

Means are provided for effecting power height adjustment of the seat and this comprises a motor 46 having its drive shaft connected to a motor mount and gear box 47 which is pivoted to a bracket 48 by a pivot mounting indicated at 49. Gearing within the gear box 47 drives a threaded shaft 50. Mounted on the threaded shaft 50 for movement longitudinally thereof is a nut 52 which is connected by an arm device 54 fixedly secured to the torsion bar 24 as by welds indicated at 55. The arm device 54 is pivotally connected to the nut 52 by pivot means indicated at 56.

Since the arm device 54 is welded or otherwise rigidly secured to the torsion bar 24, it will of course be apparent that the nut 52 and arm device 54 will cause the torsion bar 24 to swing upwardly in an arc about the axis of pivot connection 18 when the nut 52 is moved to the right. The nut 52 will accordingly not move in a tsraight line and it is for this reason that the pivot mounting 49 for the gear box 47 is provided. Movement of the nut 52 to the right effects generally upward movement of the torsion bar 24 and hence, causes generally upward movement of the front end of the seat supporting frame 22. This of course results in counterclockwise rotation of the lever 16 which motion is effective to swing the lever 30 clockwise about its pivot support 32, thus raising the rear end of the lever 30 and correspondingly raising the rear end of the seat supporting frame 22.

Figure 5:
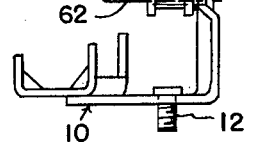
FIGURE 5 is a fragmentary front elevational view looking in the direction of the arrows 5—5, FIGURE 1.

It is of course essential that identical movement be imparted to the seat adjusting mechanism at the opposite side of the seat and this is accomplished through the torsion bar 24 which is fixed to the forward end of the front height adjusting lever 60. The connection is best illustrated in FIGURE 5 where it will be seen that the torsion bar 24 is connected by a pin 62 to a sleeve 64, the sleeve being welded as indicated at 66 to the front height adjusting lever 60. The front height adjusting lever 60, as best seen in FIGURES 1 and 4, is provided with a pivot mounting 68 intermediate its ends and is provided with a pin and slot connection indicated generally at 70 with the laterally overlapped forward end of the rear height adjusting lever 72. A coil spring 73 similar in all respects to the coil spring 26 previously described, is provided, one end being received in a slot in the pivot stud 68 and the other end extending around the torsion bar 24.

Lever 72 in turn is provided with a pivot connection 74 to one flange 76 of the base 78. The seat supporting frame 22a includes depending legs 80 which are pivoted to the torsion bar 24 as best seen in FIGURE 5. Similarly, the seat supporting frame 22a includes at its rear left hand corner a depending leg 82 which is provided with a pin and slot connection indicated generally at 84 to the rear end of the rear height adjusting lever 72.

At the right hand side of the seat the torsion bar 24 is fixedly connected to the lever 16 through the medium of a sleeve 86 to which the lever 16 is welded, the sleeve being pinned or otherwise fixedly secured to the torsion bar 24.

Accordingly, the arm device 54 together with the torsion bar 24 and the forwardly extending arm of the lever 16, constitutes in effect a rigid lever assembly rotatable as a unit about the axis of the pivot connection 18.

From FIGURE 2 it will be observed that an imaginary line joining the axis of pivot connection 18 and pivot connection 56 extends at approximately a 45 degree angle with respect to the vertical, and this position corresponds to the lower position of the seat. As the nut 52 is advanced to the right as seen in FIGURE 2, this imaginary lever arm passes through the vertical to a position therebeyond, thus providing the most mechanical advantage.

It will be observed that movement of the nut 52 to the right as seen in FIGURE 2, has the primary effect of rotating the lever 16 about its stationary pivot support 18. However, this is accomplished through the torsion bar 24 which not only moves in an arcuate path with the axis of the pivot connection 18 as centered, but also, the torsion bar 24 is turned about its own axis. This turning of the torsion bar which is the result of rocking the lever 16 about its pivot mounting is transmitted by the torsion bar 24 to the left hand side of the seat construction where it is effective to rock the lever 60 about its pivot support 68, and thus cause identical operation of the seat raising structure at both ends of the seat.

In addition to the mechanism for effecting substantially vertical adjustment of the seat, means are provided for effecting a generally fore and aft seat adjustment. This mechanism comprises the use of a slide 90 at the right hand unit and a slide 92 in the left hand unit, the slides being adapted for connection directly to the seat supporting frame 22 by means including the studs 94.

Referring now to FIGURES 1, 4, 6 and 7 there is shown a horizontal adjustment motor 96 carried by a motor support and gear box 98, the latter being supported by a pivot support 100 and a mounting bracket 102. The gear box 98 is connected to a threaded shaft 104 which extends within an elongated nut assembly 106 which is connected by pivot means indicated at 108 to a bracket 110 welded or otherwise rigidly connected to the slide 92 as best illustrated in FIGURE 7. Also connected to the pivot means 108 is a rigid link 112 to the opposite end of which is connected an arm 114 fixedly connected to a second torsion bar 116. As best seen in FIGURE 1, the connection between the arm 114 and the torsion bar 116 is a welded connection indicated at 118. Accordingly, as the motor 96 is operated to drive the screw shaft 104, the nut assembly 106 is moved generally horizontally longitudinally of the screw shaft 104, thus moving the slide 92 on the elongated element 22a. At the same time, movement of the slide 92, through the link 112 and arm 114 causes a corresponding rotation of the torsion bar 116.

The torsion bar 116 is of course for the purpose of transmitting the motion from the left hand adjustment unit to the right hand adjustment unit so as to cause identical fore and aft adjustment of the opposite ends of the seat construction. The right hand adjustment unit as best seen in FIGURES 1 and 2, includes an arm 122 fixedly secured to the torsion bar 116 and shaped identically with the arm 114. Connected to the arm 122 is a rigid link 124 dimensioned identically with the link 112. The link 124 is pivotally connected to the slide 90 by pivot means indicated at 126. Accordingly, as the motor 96 is energized to effect fore and aft adjustment of the seat, the links and levers in the left hand adjusting unit adjust the slide 92 and at the same time effect a predetermined rotation of the torsion bar 116. This rotation of the torsion bar 116 through the agency of the arm 122 and link 124 effects exactly similar movement of the slide 90.

In order to provide for stability of the seat construction the rear height adjusting levers 30 and 74 are provided with nylon blocks 130 which operate as spacers between the relatively long rear height adjusting levers and the adjacent flange portions 14 and 76.

While the connection between the lever 16 and the lever 30 at one side of the seat, and between the levers 60 and 72 is illustrated as a pin and slot connection, it will of course be appreciated that the requirement is for a lost motion connection and such connection may be provided by an interposed link similar to the link 40 shown in FIGURE 2A.

The drawings and the foregoing specification constitute a description of the improved seat adjusting mechanism in such full, clear, concise and exact terms as to enable any person skilled in the art to practice the invention, the scope of which is indicated by the appended claims.

What I claim as my invention is:

1. Seat adjusting mechanism comprising a base, a seat frame above said base, a front height adjusting lever having pivot means intermediate its ends mounting said lever to said base, said front height adjusting lever extending in a fore and aft direction, pivot means connecting the front end of said front height adjusting lever to said seat frame, a rear height adjusting lever having pivot means intermediate its ends mounting said rear height adjusting lever to said base, said rear height adjusting lever extending in a fore and aft direction, pivot means connecting the rear end of said rear height adjusting lever to said seat frame, the front end of said rear height adjusting lever and the rear end of said front height adjusting lever being in laterally overlapping relation, and a mechanical connection directly between said overlapping ends to produce simultaneous swinging movement of said levers.

2. Mechanism as defined in claim 1 in which said mechanical connection is a pin and slot connection.

3. Mechanism as defined in claim 1 in which said mechanical connection comprises a generally vertically extending short link pivotally connected between the overlapping ends.

4. Seat adjusting mechanism comprising a base, a seat frame above said base, a front height adjusting lever having pivot means intermediate its ends mounting said lever to said base, said front height adjusting lever extending in a fore and aft direction, pivot means connecting the front end of said front height adjusting lever to said seat frame, a rear height adjusting lever having pivot means intermediate its ends mounting said rear height adjusting lever to said base, said rear height adjusting lever extending in a fore and aft direction, pivot means connecting the rear end of said rear height adjusting lever to said seat frame, the front end of said rear height adjusting lever and the rear end of said front height adjusting lever being in laterally overlapping relation, a mechanical connection directly between said overlapping ends to produce simultaneous swinging movement of said levers, actuating means for said mechanism comprising an arm fixed to one of said height adjusting levers, and power means connected to said arm to swing said arm and said one height adjusting lever about its pivot connection to said frame.

5. Seat adjusting mechanism comprising a base, a seat frame above said base, a front height adjusting lever having pivot means intermediate its ends mounting said lever to said base, said front height adjusting lever extending in a fore and aft direction, pivot means connecting the front end of said front height adjusting lever to said seat frame, a rear height adjusting lever having pivot means intermediate its ends mounting said rear height adjusting lever to said base, said rear height adjusting lever extending in a fore and aft direction, pivot means connecting the rear end of said rear height adjusting lever to said seat frame, the front end of said rear height adjusting lever and the rear end of said front height adjusting lever being in laterally overlapping relation, and a mechanical connection directly between said overlapping ends to produce simultaneous swinging movement of said levers, the pivot means mounting said front and rear height adjusting levers to said base being substantially midway between the ends thereof to provide substantially equal lift to the front and rear edges of the seat frame.

6. Seat adjusting mechanism comprising a seat frame, a pair of units positioned beneath opposite ends of said frame, each of said units comprising a base, a front height adjusting lever having pivot means intermediate its ends mounting said lever to said base, said front height adjusting lever extending in a fore and aft direction, pivot means connecting the front end of said front height adjusting lever to said seat frame, a rear height adjusting lever having pivot means intermediate its ends mounting said rear height adjusting lever to said base, said rear height adjusting lever extending in a fore and aft direction, pivot means connecting the rear end of said rear height adjusting lever to said seat frame, the front end of said rear height adjusting lever and the rear end of said front height adjusting lever being in laterally overlapping relation, a mechanical connection directly between said overlapping ends to produce simultaneous swinging movement of said levers, a torsion bar extending transversely between said units and having its ends non-rotatably fixed to corresponding height adjusting levers, and means for swinging said corresponding height adjusting levers and torsion bar as a unit.

7. Seat adjusting mechanism comprising a seat frame, a pair of units positioned beneath opposite ends of said frame, each of said units comprising a base, a front height adjusting lever having pivot means intermediate its ends mounting said lever to said base, said front height adjusting lever extending in a fore and aft direction, pivot means connecting the front end of said front height adjusting lever to said seat frame, a rear height adjusting lever having pivot means intermediate its ends mounting said rear height adjusting lever to said base, said rear height adjusting lever extending in a fore and aft direction, pivot means connecting the rear end of said rear height adjusting lever to said seat frame, the front end of said rear height adjusting lever and the rear end of said front height adjusting lever being in laterally overlapping relation, a mechanical connection directly between said overlapping ends to produce simultaneous swinging movement of said levers, a torsion bar extending transversely between said units and having its ends non-rotatably fixed to corresponding height adjusting levers, an arm non-rotatably fixed to said torsion bar, and power means connected to said arm to swing said torsion bar about the axis of the pivot means mounting said corresponding height adjusting levers to said bases and to turn said torsion bar in space about its own axis.

8. Mechanism as defined in claim 7 in which said power means comprises a motor, a pivot mounting for said motor, a screw shaft connected to said motor, and a nut on said screw shaft pivotally connected to said arm.

9. Seat adjusting mechanism comprising similar adjusting devices at opposite ends of a seat, each of said devices comprising a lever, said levers having fixed transversely aligned pivot mounts, a torsion bar fixedly connected to said levers at transversely aligned points spaced from the axes of said pivot mounts, and power means at one end of the seat connected substantially directly to one of said levers for swinging said levers and torsion bar in unison.

10. Seat adjusting mechanism comprising similar adjusting devices at opposite ends of a seat, each of said devices comprising a lever, said levers having fixed transversely aligned pivot mounts, a torsion bar fixedly connected to said levers at transversely aligned points spaced from the axes of said pivot mounts, an arm fixed to said torsion bar, and power means connected to said arm.

11. Seat adjusting mechanism comprising similar adjusting devices at opposite ends of a seat, each of said devices comprising a lever, said levers having fixed transversely aligned pivot mounts, a torsion bar fixedly connected to said levers at transversely aligned points spaced from the axes of said pivot mounts, an arm fixed to said torsion bar, power means comprising an element movable substantially fore and aft of the seat, and pivot means connecting said element to said arm.

References Cited in the file of this patent
UNITED STATES PATENTS

| | | |
|---|---|---|
| 2,907,371 | Scott | Oct. 6, 1959 |
| 2,922,462 | Kalvaitis | Jan. 29, 1960 |